United States Patent [19]

Chee

[11] 4,335,278
[45] Jun. 15, 1982

[54] COMBINED TAPE RECORDING AND PLAYBACK APPARATUS AND TELEPHONE ANSWERING APPARATUS CONTROLLED BY PRE-RECORDED SIGNALS

[75] Inventor: Tseng Chee, Kowloon, Hong Kong

[73] Assignee: Elite Electrical Products Limited, Kowloon, Hong Kong

[21] Appl. No.: 112,992

[22] Filed: Oct. 17, 1980

[51] Int. Cl.³ .............................................. H04M 1/64
[52] U.S. Cl. .................................................. 179/6.06
[58] Field of Search ............... 179/6 R, 6 AC, 6 C, 179/6 E, 6.06, 6.13–6.16; 360/134, 132

[56] References Cited

U.S. PATENT DOCUMENTS

| | | | |
|---|---|---|---|
| 3,586,779 | 6/1971 | Chernach | 179/6 R |
| 3,728,489 | 4/1973 | Beacham | 179/6 R |
| 3,947,642 | 3/1976 | Meyerle | 179/6 R |
| 4,230,909 | 10/1980 | Baum | 179/6.06 |

Primary Examiner—Raymond F. Cardillo, Jr.
Attorney, Agent, or Firm—Jordan and Hamburg

[57] ABSTRACT

A telephone answering system, which may also be employed as a tape recorder, includes a tape having two tracks. A playback/record head is aligned for cooperation with one of the tracks and a control head is aligned for cooperation with the other track. The circuit is connected to selectively intercouple the record/playback head and telephone lines in response to signals received by the control head. The control circuitry may include a flip-flop responsive to the output of the control head, and interconnected by way of transistor gates for selectively directing the transfer of signals between the telephone line and playback/record head.

1 Claim, 7 Drawing Figures

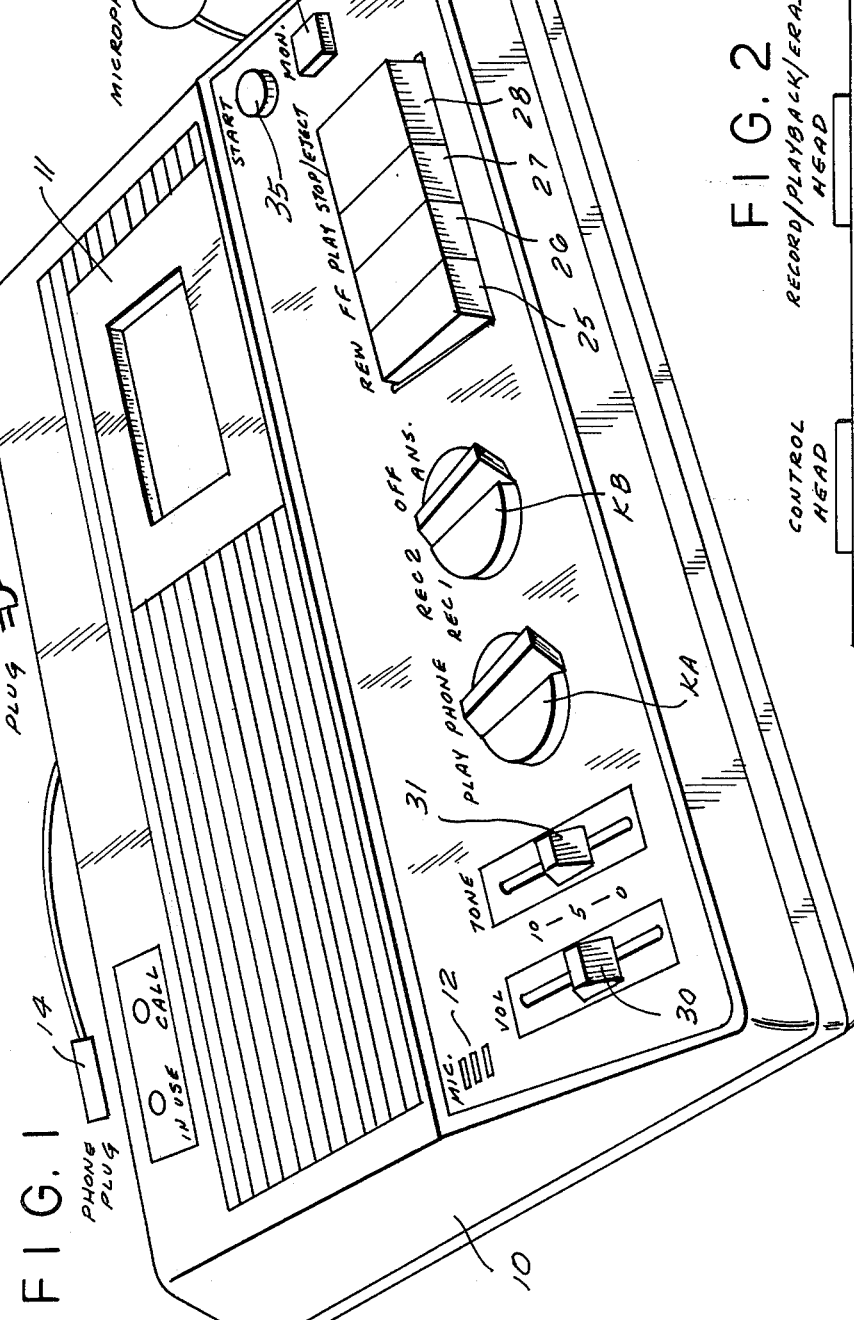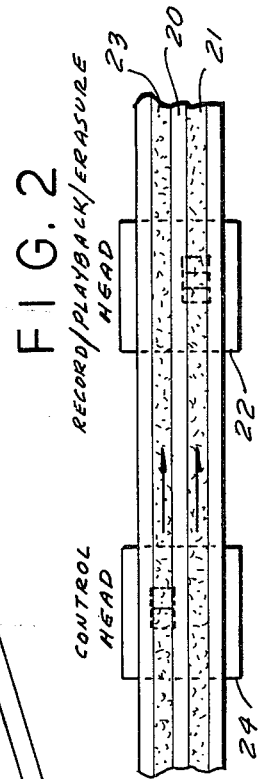

COMBINED TAPE RECORDING AND PLAYBACK APPARATUS AND TELEPHONE ANSWERING APPARATUS CONTROLLED BY PRE-RECORDED SIGNALS

BACKGROUND OF THE DISCLOSURE

The invention is directed to an improved telephone answering apparatus, and is more particularly directed to a telephone answering apparatus which may alternatively be employed as a tape recorder, independently of the telephone lines.

The provision of tape recording apparatus for applying prerecorded announcements to a telephone line, and for subsequently recording messages received from the telephone line are well known. In devices of this type, magnetic tape is conventionally employed as the recording medium, the equipment being responsive to ringing signals on the telephone line for controlling the operation of the drive for the tape.

SUMMARY OF THE INVENTION

The invention is directed to an improved apparatus of the above type, wherein the apparatus may alternately be employed as a tape recorder. Preferably, the apparatus is adapted to accept conventional cassettes, such as two-track cassettes. When the equipment is to be employed in telephone answering service, the cassette employed has a special tape therein, with one of the tracks having a plurality of control signals prerecorded thereon, at spaced apart locations. The prerecorded control signals are preferably permanently recorded on the second track. The cassette, in this instance, is to be installed in the apparatus in only one position whereby the other track may be employed to record incoming messages, as well as to have recorded thereon prerecorded announcements to be applied to the telephone lines.

When the apparatus is to be employed as a tape recorder, a conventional tape is employed, the orientation of the tape depending upon which of the two tracks is to be used at a given time.

The apparatus itself incorporates a control head responsive to the control track, signals on the control head being adapted to control the direction of signal transfer between the telephone line and a playback/record head positioned to cooperate with the other track. For this purpose, the control head may control the state of a flip-flop, the output of the flip-flop being employed to control a motor drive for the cassette, as well as to selectively control a plurality of transistor gates in the signal path. The apparatus is preferably provided with a microphone, to enable recording of signals on a conventional tape in the usual manner. In addition, under the control of the signals on the control track on the special tape, prerecorded announcements may be made on the portions of the first track dedicated to announcements, whereby recording on the remainder of the tape can be only effected by way of the telephone lines. This latter portion of the circuit may include a flip-flop responsive to either ringing current on the telephone line or the depression of a "Start" button, the flip-flop being connected to maintain drive on the tape until the start of a further cycle. In the recording of announcements, suitable indicating lights are provided to show when the operator should cease making announcements into the microphone.

BRIEF FIGURE DESCRIPTION

In order that the invention will be more clearly understood, it will now be disclosed in greater detail with reference to the accompanying drawings, wherein:

FIG. 1 is a perspective view of a telephone answering apparatus in accordance with the invention;

FIG. 2 is an enlarged view of a portion of a tape that may be employed in the apparatus of FIG. 1, including the control and play/record heads;

FIGS. 4, 5, 6 and 7 are portions of a circuit diagram for a preferred embodiment of the invention, the encircled leads bearing the same indicia indicating the interconnections of the leads of the different figures.

Figure 4:
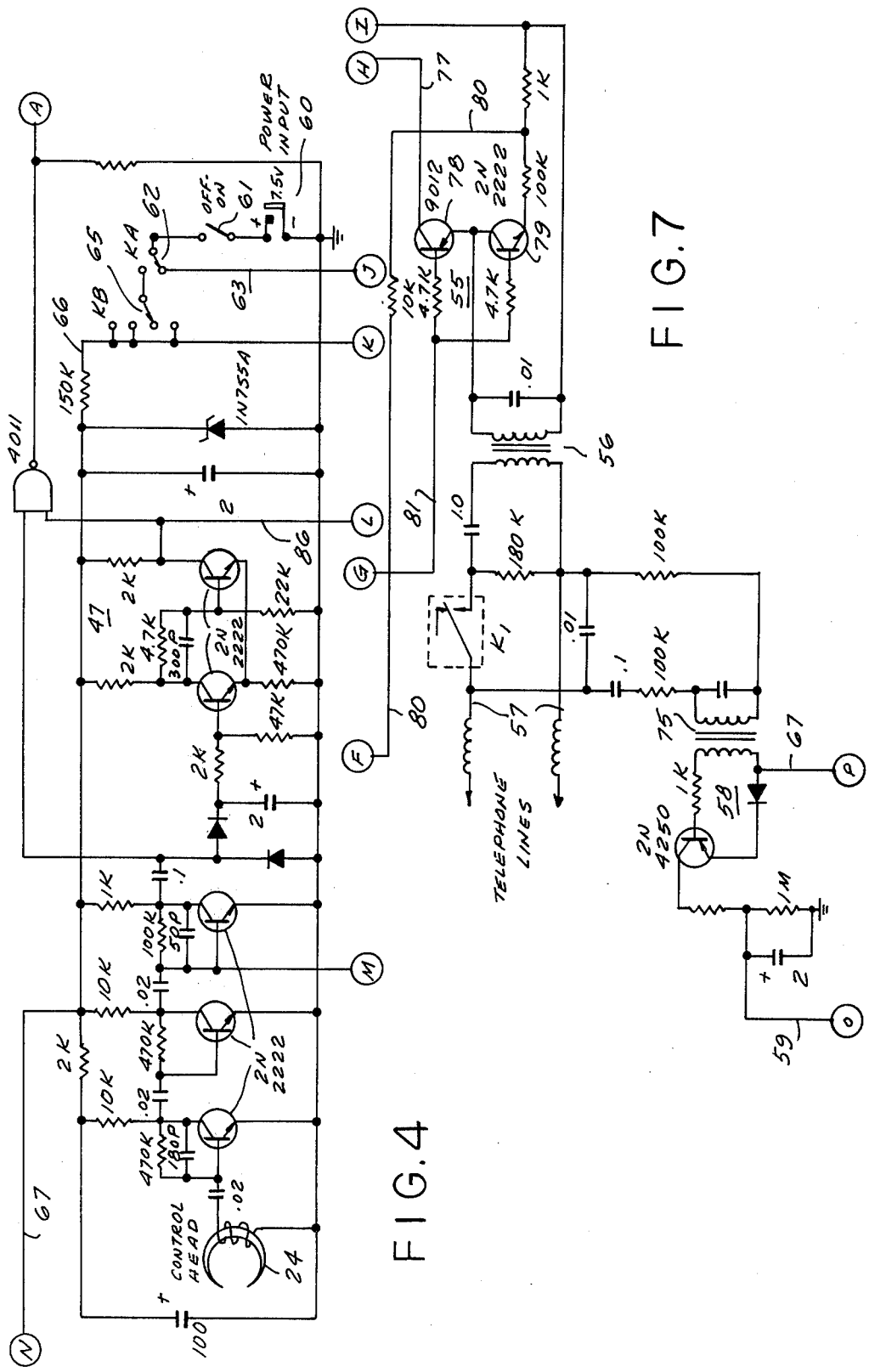
Figure 5:
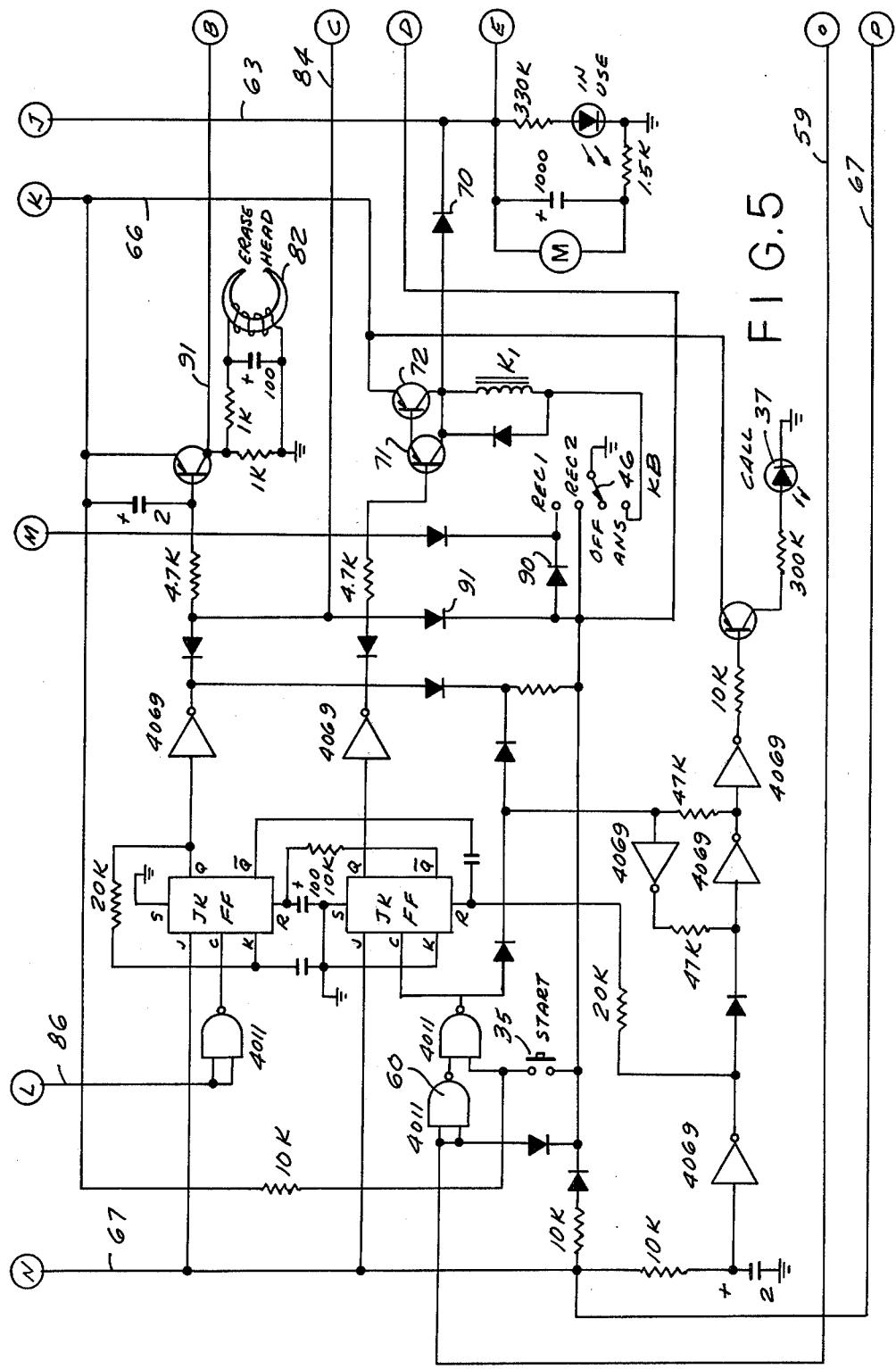
Figure 6:
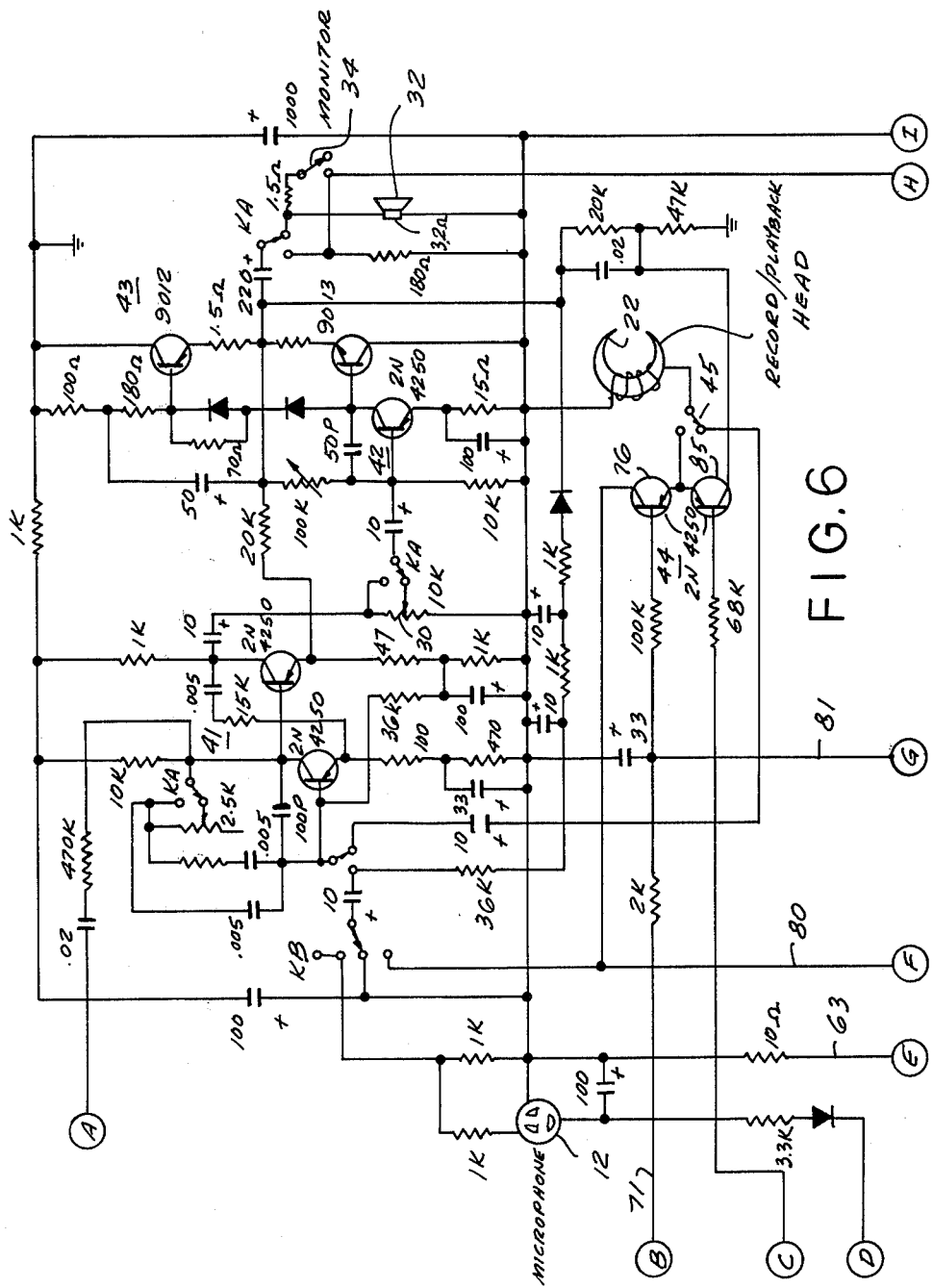

In FIGS. 4–7, FIG. 4 will generally be disclosed to the upper left, FIG. 5 will be disposed generally to the lower left, FIG. 6 will be disposed generally to the upper right, and FIG. 7 will be disposed generally to the lower right side of the composite drawing.

DETAILED DISCLOSURE OF THE INVENTION

Referring now to FIG. 1, therein is illustrated the case 10 of a tape recorder and playback apparatus in accordance with the invention, incorporating telephone answering features. The case includes a hinged cover 11 to permit the insulation of a cassette therein, as is conventional in recording and playback devices. The apparatus is further provided with a microphone 12 of conventional nature, a power source 13 which may be a line connected to an AC plug, with suitable voltage conversion devices, or a battery (not shown) for providing the correct DC operating voltage. In addition, a plug 14 is connected to the apparatus for enabling interconnection of the apparatus with a conventional phone system.

Alternatively, a microphone 16 may be externally connected to the apparatus.

The apparatus is adapted for use with two types of tape. In conventional use of the apparatus as a recording and playback device, the cassette tape may be of the conventional two-track arrangement, so that the cassette may be reversed for cooperation in both directions of movement with the playback/record head. When the apparatus is employed as an answering service device, however, a special type of tape must be employed as illustrated in FIG. 2. The tape 20 illustrated in FIG. 2 has one recording track 21 positioned to cooperate with the record/playback head 22, and a second prerecorded track 23 positioned to cooperate with the control head 24. The tape must also be oriented when employed in the apparatus, with this relationship of the tracks. This may be effected, for example, by always employing the telephone answering tape with a determined side upward. This is necessary in view of the fact that prerecorded control information on the track 23 must cooperate with the control head, for proper operation in answering service. For example, determined spaces of the tape corresponding respectively to the start of the announcement, the end of the announcement, the start of a portion of tape allotted to recording the message and the end thereof may have a determined signal, for example, an oscillation of given frequency, preferably a sine wave of 1–3, most preferably 1.5 Kc, recorded thereon, in order to enable the desired control.

Referring again to FIG. 1, the apparatus is provided with a function switch KB having four positions, and a function switch KA having two positions. The two-position function switch KA has a "Phone" position, which is set when the apparatus is to be employed as a recorder and also when the apparatus is to be employed in a telephone answering service. In the "Play" position, the apparatus is adapted to function only as a cassette player.

The function switch KB has a "Record 1" position which is set if the apparatus is to be employed as an ordinary cassette recorder; a "Record 2" position when the apparatus is to be employed for initially recording announcements to be made on the telephone answering tape; and an "Off" position where all functions are turned off, and an "Answer"0 position when the apparatus is to be employed in telephone answering service.

In addition, the apparatus is provided with a number of mechanical or electromechanical controls, for example, for controlling the speeds and directions of the spindles for the cassette. Thus, a "Rewind" button 25, a "Fast Forward" button 26, a "Play" button 27 and a "Stop" button 28 are provided in the conventional manner for cassette players. The "Stop" button 28 may be coupled to provide a further function, such that upon a first depression of this button the spindles are stopped, and upon a second depression the eject door 11 is opened.

The apparatus further includes conventional volume and tone controls 30 and 31 respectively, and a speaker 32, which is seen in FIG. 6 but not in FIG. 1.

A Monitor button 34 is provided on the casing to enable listening to calls when the apparatus is in the phone position of switch KA. A "Start" button 35 serves the function of starting to record upon a single depression thereof.

The apparatus is further provided with an "In use" light 36 which may be an LED, and is connected to be illuminated whenever the apparatus is turned on, i.e., is in use. In addition, a "Call" light 37, which may also be an LED, is provided for indicating when the machine is recording as well as when a telephone call has been received.

OPERATION

Before proceeding with a description of the apparatus of the invention, the operation thereof will be explained with reference to the controls illustrated in FIG. 1. This description of course assumes the application of proper power to the device as well as the interconnection of the system to a telephone line, where necessary.

When the apparatus is to be employed in normal playback of recordings, the function switch KA is switched to the "Play" position, whereby the apparatus will operate as a conventional cassette recording device. In this position, the position of the function switch KB is of no importance, it being apparent of course that the button 27 must be depressed for this type of operation. The cassettes played may be conventional cassettes or the special cassette in accordance with the invention for use in the answering function of the apparatus. It will be noted that FIGS. 4–7 depict this switch in the "Play" position. If the switch KA is switched to the "Phone" position, the functions of the switch KB will become effective. In the "Record 1" position, the apparatus operates as a conventional cassette recorder, for recording of signals received from the microphone 12. In the conventional recording operation, the tape may of course be turned over in the conventional manner for recording on both the tracks.

In the "Answer" position of the function switch KB, the apparatus acts to receive and record messages received from the phone lines. It is to be noted that the telephone answering tape employed for this purpose has prerecorded messages or announcements spaced therealong, for example, to provide 16 second announcements indicating that the caller should dictate a message into the phone for recording. These announcements are spaced on the tape, by blank regions enabling the recording of messages of determined length. In this type of operation, the button 27 is of course depressed, and it is assumed that the tape has been initially rewound to its start.

Whenever a call is received, the "Call" light will be illuminated. The circuit interconnections of the apparatus do not apply received call signals to the speaker in the "Answer" function position, so that if an operator desires to listen to an incoming call, he may depress the "Monitor" button 34, and hold it depressed as long as he continues to wish to hear the message. The message will then be audible at the speaker.

In order to play back the telephone messages, the above discussed procedure concerning playback of tapes is employed, the tapes of course being initially rewound to their initial position.

If the operator desires the prerecorded announcements in the provided sequences on the tape, a tape must be provided which has the control track prerecorded with control signals as discussed above. When such a tape is inserted in the machine, with the proper side upward, and the tape fully rewound, the switch KA is turned to the "Phone" position and switch KB is turned to the "Record 2" position. The "Play" button 27 is depressed and the "Monitor" button must be released. The "Start" key 35 must then initially be depressed, resulting in the lighting of the "Call" light 37. The operator must then proceed to speak his message within the determined time. After this determined time, under the control of the tape, the "Call" light will be turned off. The operator must then wait until the "In use" light 36 turns off and the recording procedure will then be repeated for the second announcement. In other words, the ignition of the "Call" light indicates the times during which the user must record his messages, and the turning off of the "In use" light indicates the time at which a recording may be started by depression of the "Start" button 35.

Figure 3:
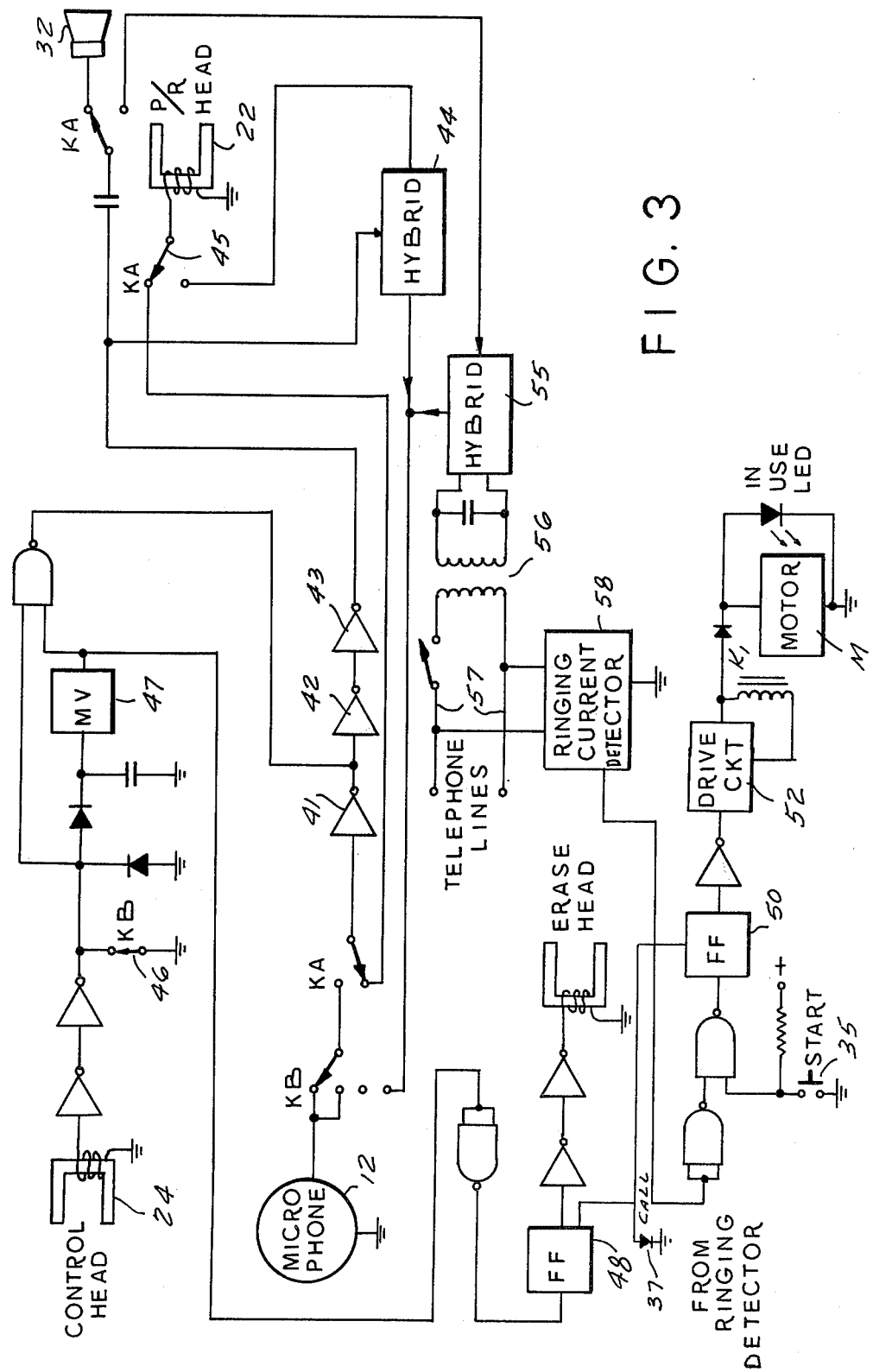
FIG. 3 is a simplified block diagram of the apparatus of FIG. 1.

The general orientation of the system of the invention is shown more clearly in FIG. 3, wherein the switch KA is shown in the "Play" position. In this position, it is apparent that the output of the playback/record head 22 is applied by way of a series of amplifiers 41, 42 and 43 to the speaker 32.

If the switch KA is now moved to the "Phone" position and the switch KB is turned to the "Record 1" position, as illustrated, it is apparent that the output of the microphone phone 12 will be applied directly to the amplifiers 41, 42 and 43, the signals then being applied by way of a hybrid network 44 to the playback record head 22 by way of the contacts 45 of the switch KA.

If, now, the switch KB is turned to the "Record 2" position, the received signals will be recorded in the manner above described but a contact 46 of the switch KB will unground the output of the control head 24, whereby a rectified output of the control head will initiate an output signal by the trigger circuit 47 to change the state of a flip-flop 48, thereby igniting the "Call" light 37. Specifically, the signal at the output of the fifth 2 N 2222 transistor (FIG. 4) is a D.C. square wave of the same frequency as the control signal and this initiates, through a 2μF capacitor, the output signal (a single D.C. square wave pulse) by the trigger circuit 47. The purpose of the 4011 gate having its input terminal L connected to the output of the aforementioned 2 N 2222 transistor is to open when the control signal is picked up and otherwise stay closed to keep noise from being transmitted to the speaker. When the control signal is no longer present, the flip-flop removes the energization of the "Call" lamp 37, thereby indicating to the operator that the announcement period is over.

When an announcement is to be recorded on the answering tape, the tape has been fully rewound, and the switch KB set to the "Record 2" position, the "Start" button 35 is depressed, thereby triggering a flip-flop 50 to turn on the "Call" lamp 37. This also effects the application of power to the drive motor M, by way of the drive circuit 52. After the determined time for an announcement message has elapsed, for example, about 16 seconds, the triggering signal from the multivibrator 47 controls the flip-flop 48 to extinguish the "Call" light and reset the flip-flop 50. The user should stop making announcements as soon as the "Call" light is extinguished.

The "In use" light, which is connected in parallel with the motor M, will remain illuminated until the time for the next announcement. This will be determined by the provision on the control track of the tape of a signal indicating the commencement of the next announcement, which effects the removal of power from the motor M, and hence extinguishing of the "In use" lamp. At this point, the user is signalled that the announcement procedure may be repeated, whereupon the "Start" button 35 is again depressed to effect the turning on of the "Call" lamp 37, and the reapplication of power to the motor M. This procedure is continued until all of the announcement periods of the tapes have been provided with a recorded message, or until a determined number of such announcements have been made.

In the above procedure it is apparent that the apparatus will be turned off (i.e., the motor not running) after the last announcement has been made.

In order to use the apparatus for telephone answering service, assuming that the tape is rewound and suitable announcements have been made thereon, the switch KB is turned to the "Answer" position, with the switch KA in the "Phone" position. As is apparent in FIG. 3, this results in the connection of the input of the amplifier 41 to the output of a hybrid network 55 for receiving telephone messages, the output of the amplifier 43 being directed to the recording head 22 by way of the hybrid network 44. As a consequence, messages received at the transformer 56 are recorded on the tape.

During announcement periods, the messages on the tape are applied from the playback/record head 22 to the hybrid 44, and thence to the input of the amplifier 41. These signals are then applied to the input of the hybrid network for application to the transformer 56.

When a telephone call is initially received by way of the telephone lines 57, the ringing current is detected in a detector 58 and applied to the flip-flop circuit 50. This results in the drive circuit energizing the motor M, and also the energization of the relay K$_1$ to connect the telephone lines to the hybrid 55, by way of the contacts K$_1$ of this relay. As a result, the announcement recorded on the tape is applied to the telephone lines. Following the announcement, the tape will continue to run for a determined period, to enable the caller to record a message on the tape. Then, the signals recorded on the control track will be detected by the control head 24, to effect the triggering of the flip-flop 48 and the consequent removal of power from the motor M preparatory to the commencement of a new calling cycle.

Referring now to FIGS. 4, 5, 6 and 7, therein is illustrated a preferred embodiment of a circuit for a telephone answering system in accordance with the invention. In these figures, in circled letters of like kind in the different figures are understood to be interconnected.

FIG. 4 generally shows the control circuit connected to the control head 24. The circuit is provided with a jack 60 for receiving input power, either by way of a battery or power supply (not shown). A power switch 61 which may be controlled, for example, by the volume control 30, is connected to apply power to the system. In the "Play" position of the contacts 62 of the switch KA, the power is directly applied to the lead 63 in FIG. 4, and thence to the motor M in FIG. 5, and to the amplifier system of FIG. 6 so that the amplifiers are energized. Power is not at this time applied to the remainder of the circuits. In the "Phone" position of the switch KA, the contacts 62 apply power to the contacts 65 of switch KB in FIG. 4, thence to provide operating voltage by way of lead 66 to the control circuit of FIG. 4, and certain portions of the circuit of FIG. 5, and by way of lead 67 as a regulator voltage to further portions of the circuit of FIG. 5 and FIG. 7. The amplifier of FIG. 6, the motor M and the "In use" lamp 36 are energized by way of a diode 70, in response to the state of the Q output of the flip-flop 50, by way of interconnected transistors 71 and 72. It will be noted that in the "Record 1" or "Record 2" positions of the switch KB, the transistors 71 and 72 are connected as a Darlington pair whereas in the "Answer" position of contact 46 of the switch, the relay K$_1$ is also energized. As further noted, the contacts 46 of switch KB, in FIG. 5, disable the signals from the control head, in the "Record 1" position of this switch.

In FIG. 7, ringing current on the telephone lines 57 is applied by way of the transformer 75 to the ringing current detector 58, the output thereof being applied by way of lead 59 to the gate 60 of FIG. 5, thereby to clock the flip-flop 50 to apply power to the audio amplifiers and motor in the "Answer" position of the switch KB. Announcements on the tape picked up by the record/playback head 22, in FIG. 6, are then applied to the input of the amplifier by way of the transistor 76, the output of the amplifier being applied by way of lead 77 and transistor 78 to the telephone lines, further by way of transformer 56 and the closed contacts K$_1$. When the signals from the caller are to be recorded, these signals are applied by way of transistor 79 and lead 80 to the input of the amplifier as seen in FIG. 6. It is noted that the bases of the transistors 76, 78 and 79 are controlled by way of a lead 81, this lead being shown in FIG. 5 to be controlled in common with erase head 82, from the Q output of the flip-flop 48. The output of this flip-flop also controls the voltage and control line 84, which is seen in FIG. 6 to control the transistor 85 for applying the output of the amplifier 43 to the record/playback head 22. In other words, the control voltages on lead 81 and 84 control the paths of signals in the circuits 44 and 50 of FIGS. 6 and 7, respectively. The flip-flop 48 is controlled from the output of the control circuit of FIG. 4, on lead 86, in the "Record 2" and "Answer" positions of the switch KB.

Assuming, for example, that a call is received on the telephone lines, when the switch KB is in the "Answer" position, this will effect the detection of ringing current on a lead 59, which in turn will clock the flip-flop 50 of FIG. 5, to interconnect the telephone lines to the amplifier by means of the relay $K_1$, and energize the motor M and audio amplifiers by way of the diode 70. At this time, it is apparent in FIG. 5 that the "In use" light 36 is also turned on. The start of the tape thereby provides a signal to the control head 24 of FIG. 4, the output signals being amplified and controlled thereby to clock the flip-flop 48, by way of the lead 86. This results in the provision of output control signals to gate the transistors 76, 78, 79 and 85 so that the output of the record/playback head is applied by way of the transistor 76 to the input of the amplifier, and thence by way of lead 77 and transistor 78, as well as the transformer 56 to the telephone lines. When this control signal has ceased, the flip-flop 48 is reset to permit the signals in the telephone lines to be applied to the audio amplifier for recording on the tape.

In the "Record 1" and "Record 2" positions of the switch KB, it is noted in FIG. 5 that contacts 46 control the voltages on the lines 81 and 84, by way of the diodes 90 and 91.

While the invention has been disclosed and described with reference to a single embodiment, it will be apparent that variations and modifications may be made therein, and it is therefore intended in the following claims to cover each such variation and modification as falls within the true spirit and scope of the invention.

What is claimed is:

1. In a telephone answering apparatus for use with a magnetic tape having first and second tracks, the apparatus including a drive for said tape, means upon the receipt of an incoming call for applying said announcements to a telephone line, and means for recording messages received from said telephone line; the improvement wherein said apparatus has a record/playback head positioned to be aligned with said first track, circuit means for recording messages from said telephone line on said first track and applying messages from said first track to said telephone line via said record/playback head, and a control head positioned to be aligned with said second track, said apparatus further comprising circuit means connected to said control head for controlling the direction of signal transfer between said record/playback head and said telephone line, a microphone, means recording signals on said first track via said record/playback head from said microphone and including switch means for selectively enabling and inhibiting control of said drive by the output of said control head, said switch means having a first position enabling recording of messages on said first track independently of control signals on said second track, and a second position wherein the drive is stopped prior to a position on the first track at which a message is to be prerecorded, and a start switch for starting said drive.

* * * * *